(12) United States Patent
Holland et al.

(10) Patent No.: US 9,699,869 B2
(45) Date of Patent: Jul. 4, 2017

(54) WIRELESS LIGHTING AND ELECTRICAL DEVICE CONTROL SYSTEM

(71) Applicants: Anthony Holland, West Vancouver (CA); Ion Toma, Richmond (CA)

(72) Inventors: Anthony Holland, West Vancouver (CA); Ion Toma, Richmond (CA)

(73) Assignee: Premier Lighting Ltd., Burnaby, BC (CA)

( * ) Notice: Subject to any disclaimer, the term of this patent is extended or adjusted under 35 U.S.C. 154(b) by 0 days.

(21) Appl. No.: 14/367,203

(22) PCT Filed: Dec. 19, 2012

(86) PCT No.: PCT/CA2012/050919
§ 371 (c)(1),
(2) Date: Jun. 19, 2014

(87) PCT Pub. No.: WO2013/091100
PCT Pub. Date: Jun. 27, 2013

(65) Prior Publication Data
US 2014/0375206 A1 Dec. 25, 2014

(30) Foreign Application Priority Data
Dec. 20, 2011 (CA) .................................. 2762869

(51) Int. Cl.
*H05B 37/02* (2006.01)
*G08G 1/14* (2006.01)
(Continued)

(52) U.S. Cl.
CPC ......... *H05B 37/0272* (2013.01); *G08G 1/142* (2013.01); *G08G 1/146* (2013.01); *H02J 9/061* (2013.01); *H04L 67/125* (2013.01); *H05B 37/0218* (2013.01); *H05B 37/0227* (2013.01); *G08B 13/19695* (2013.01);
(Continued)

(58) Field of Classification Search
CPC combination set(s) only.
See application file for complete search history.

(56) References Cited

U.S. PATENT DOCUMENTS

| 7,123,140 | B1 | 10/2006 | Denes |
| 2010/0327766 | A1 | 12/2010 | Recker |
| 2011/0012433 | A1 * | 1/2011 | Parsons ............... H05B 37/0227 307/117 |

FOREIGN PATENT DOCUMENTS

WO    WO2011151609    12/2011

* cited by examiner

*Primary Examiner* — Douglas W Owens
*Assistant Examiner* — Jianzi Chen

(57) ABSTRACT

The invention provides a plurality of individually addressable radio frequency (RF) modules, any of which can be installed with any electrical device such as an ambient condition sensor or an ambient condition modifier. A prime example would be a light fixture, whether with or without a dimmable light source efficient dimming and integrated smart sensor networking related to the lighting system itself or to other systems such as parking monitors, fire alarm monitors or security alarm monitors. Independent control processing in each lighting fixture or electrical device allows a multiplicity of sensors to be locally employed and their data to control local conditions or communicate to adjoining fixtures and electrical devices and thereby control larger portions of the lighting system network or network to several unrelated systems.

27 Claims, 11 Drawing Sheets

(51) Int. Cl.
  *H02J 9/06*    (2006.01)
  *H04L 29/08*    (2006.01)
  *G08B 13/196*    (2006.01)
  *G08B 17/00*    (2006.01)
  *H04W 84/18*    (2009.01)
(52) U.S. Cl.
  CPC ............ *G08B 17/00* (2013.01); *H04W 84/18* (2013.01); *Y02B 20/48* (2013.01)

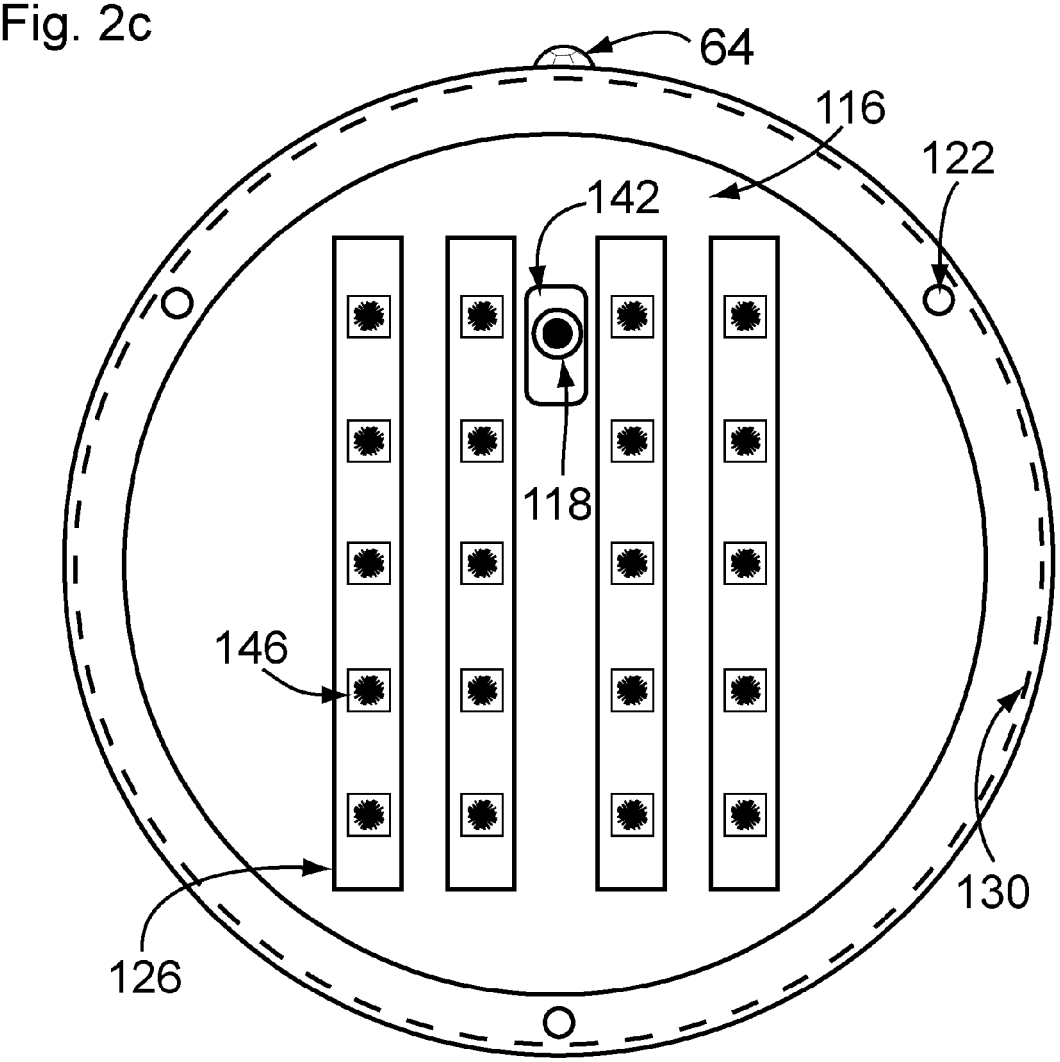

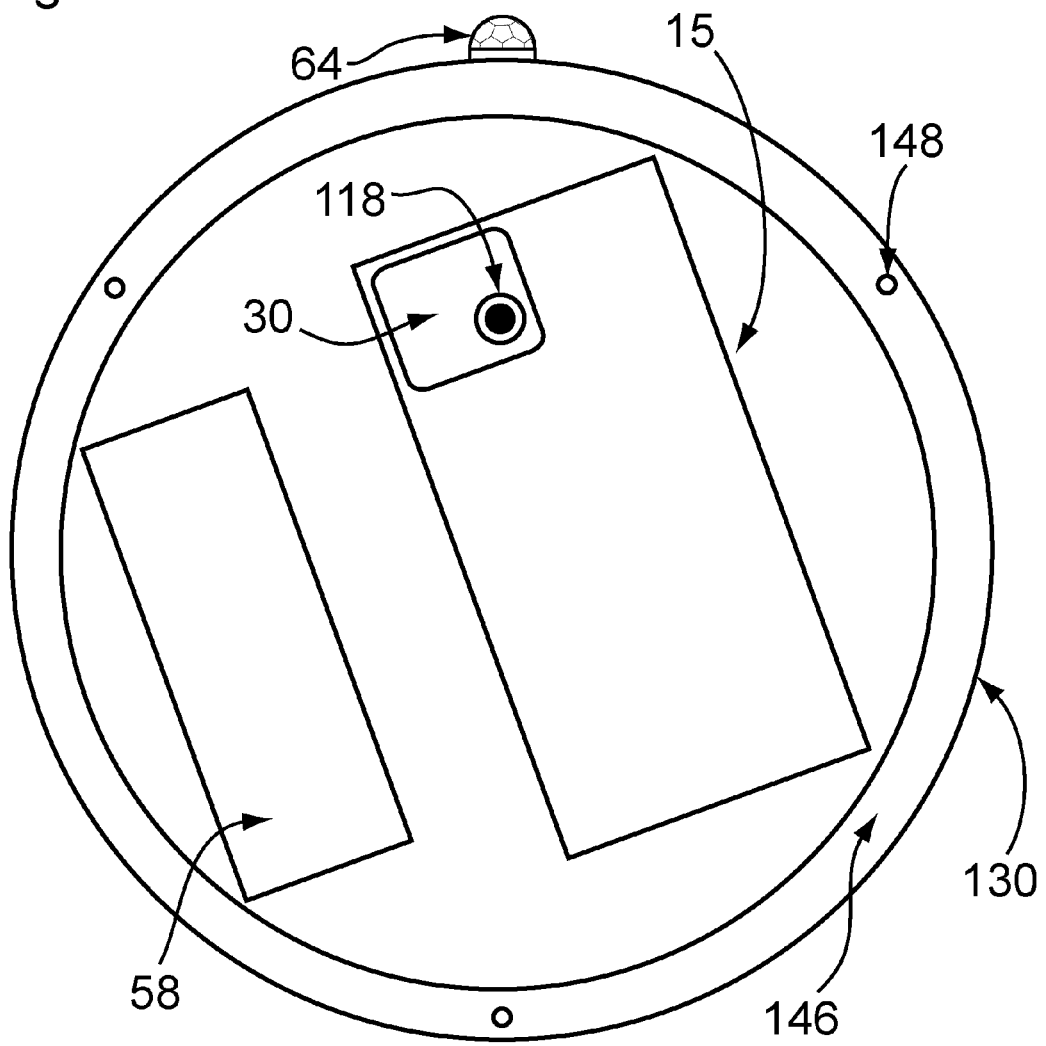

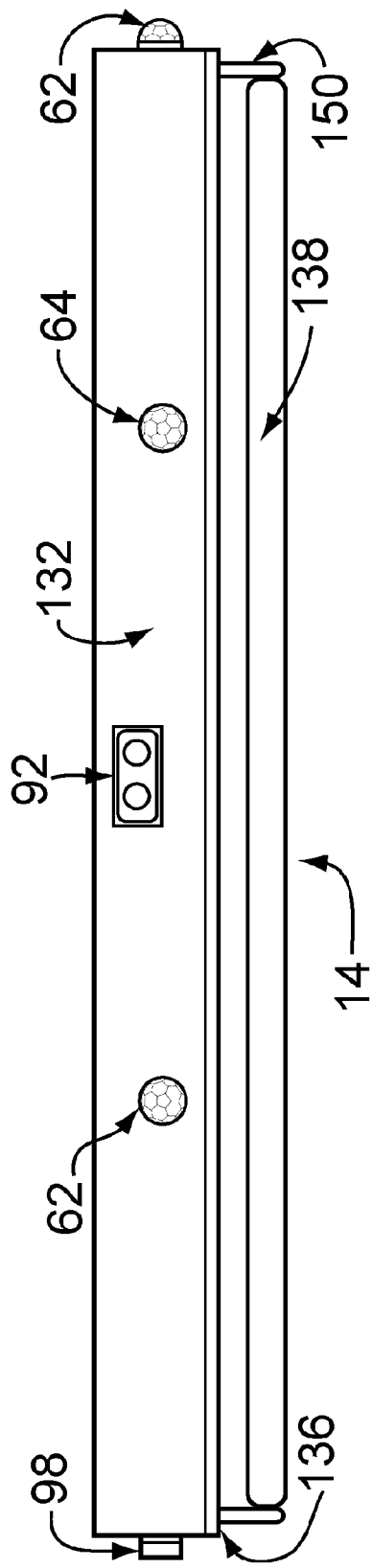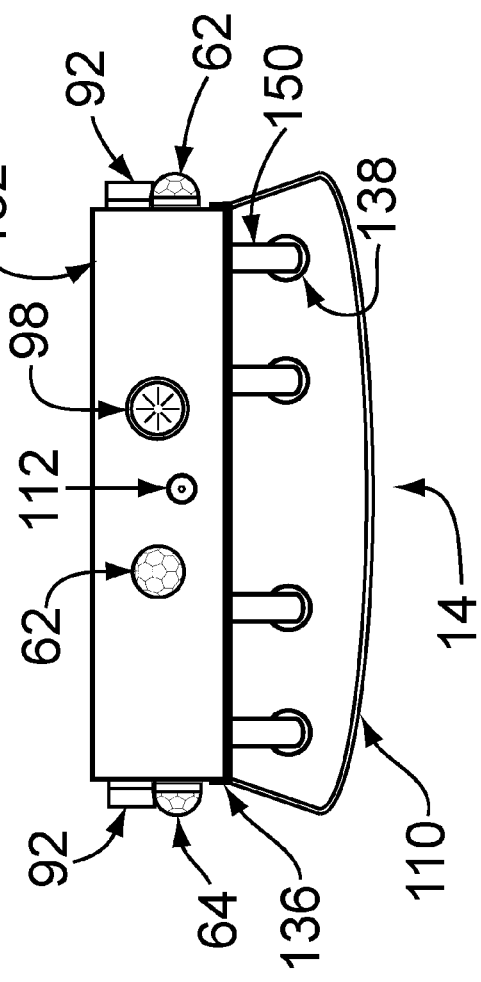

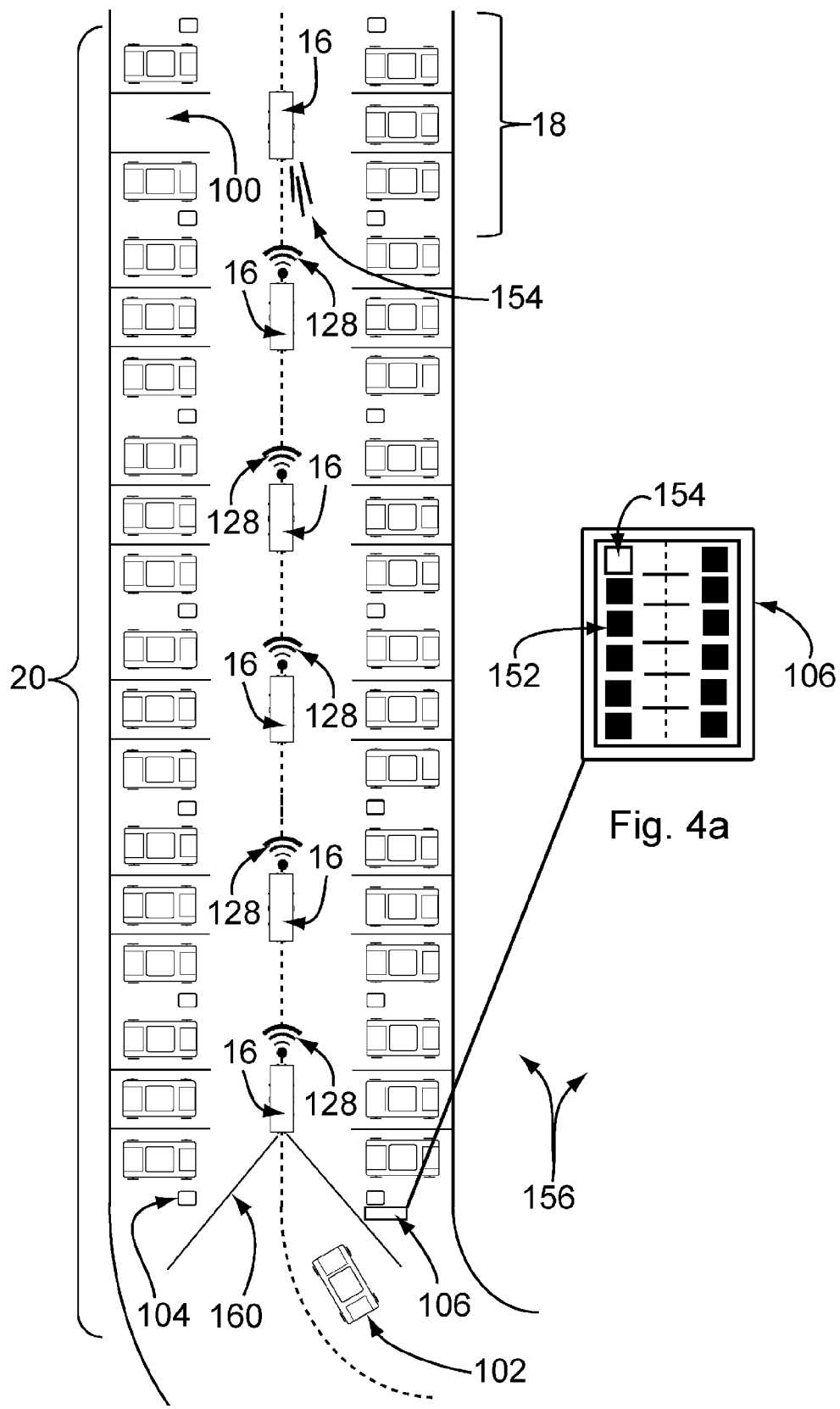

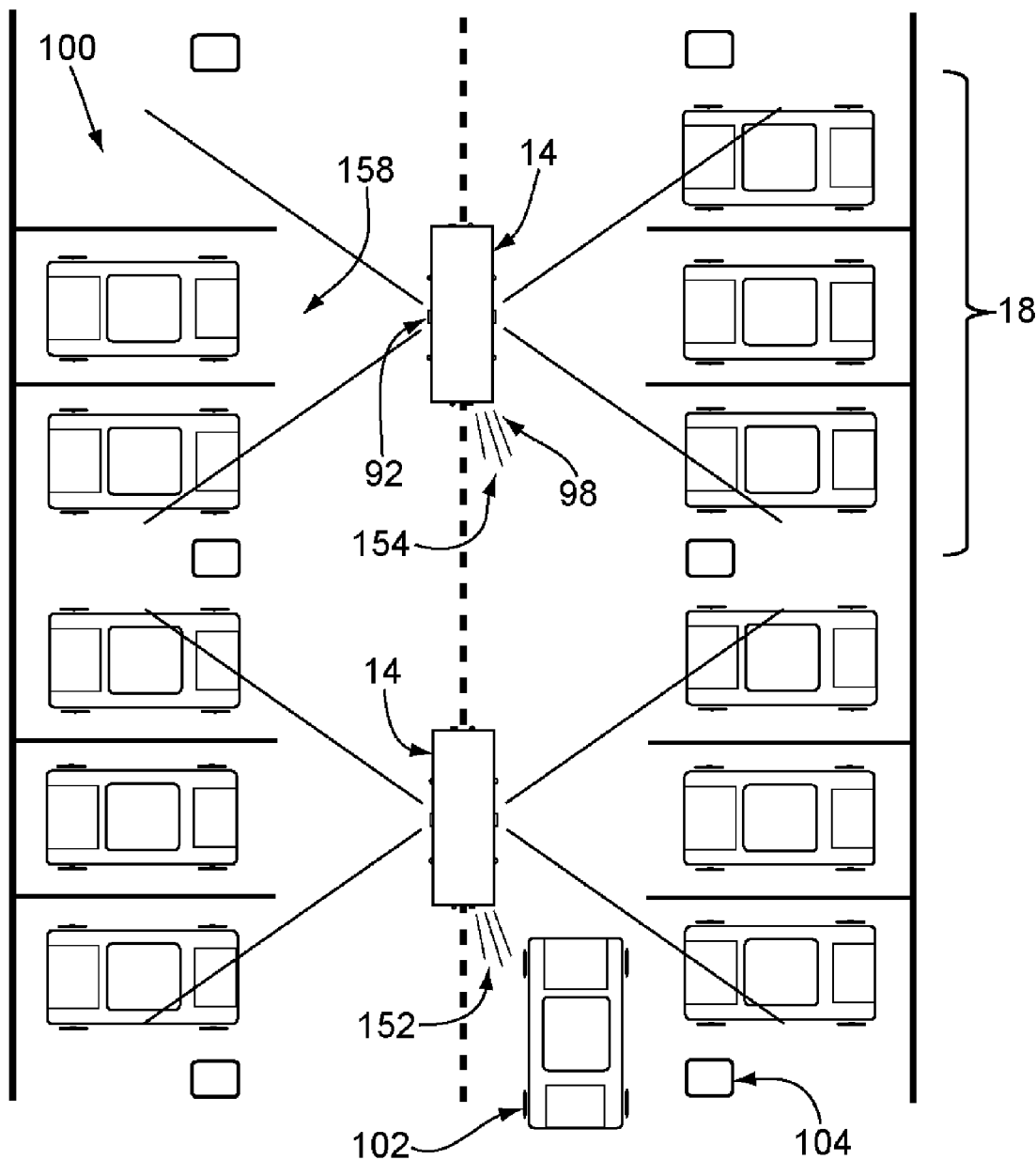

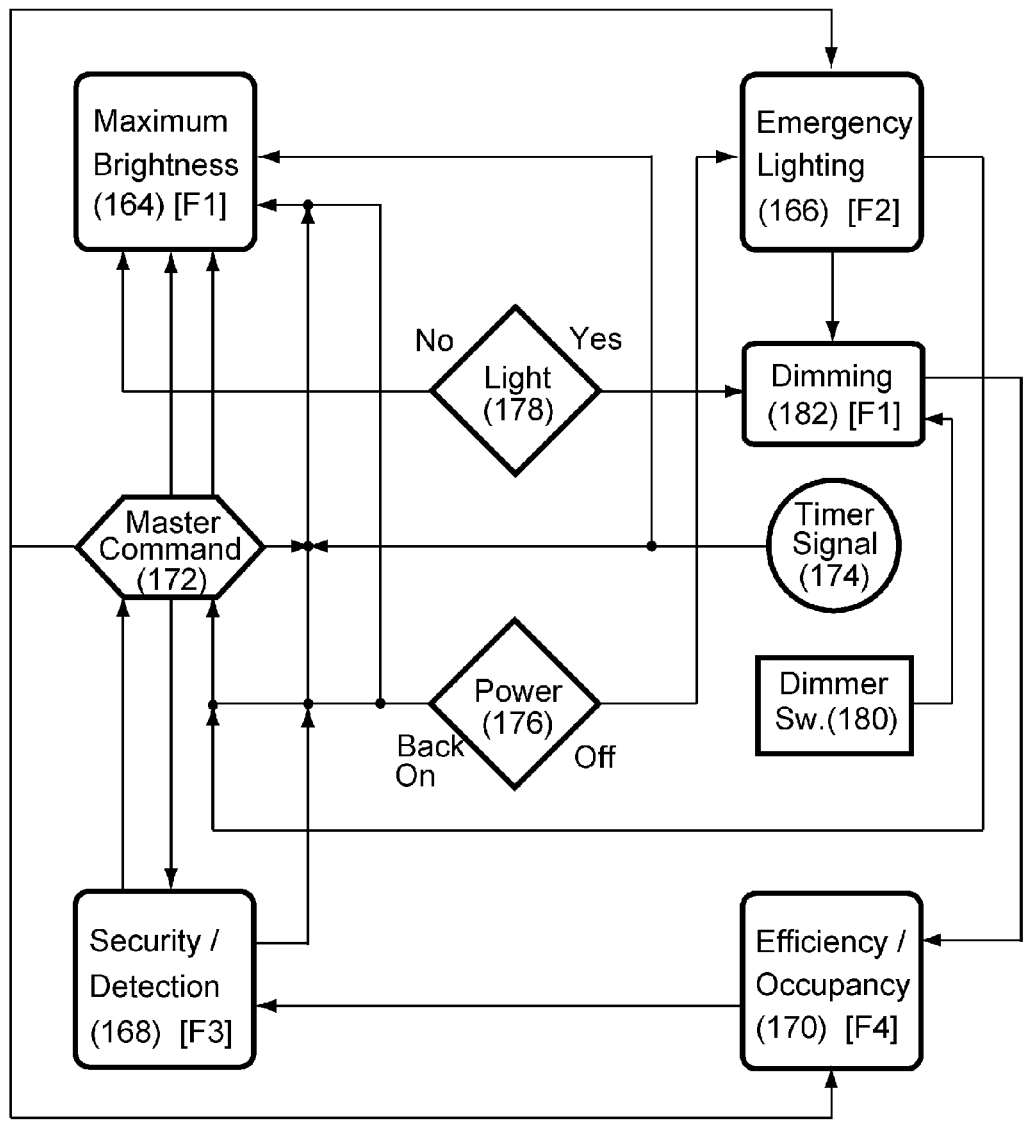

WIRELESS LIGHTING AND ELECTRICAL DEVICE CONTROL SYSTEM

FIELD OF INVENTION

This invention relates to a novel device in the general field of intelligent lighting control systems coupled with the ability to analyze from electronic sensors not related to lighting. More specifically, a wireless dimming smart sensor networking system deployable in any residential, commercial or industrial structure or streetscape. The electronic control of individual lighting fixtures via sensory input and radio frequency saves energy and extends lamp life and provides many other advantages due to greater system integration with sensor, diagnostic, power, emergency lighting and security systems. Housing an intelligent radio control module in a lighting fixture allows it to become a data gathering unit that can also analyze, react to and report input from other sensory devices not related to lighting such as but not limited to: occupancy sensors in parking garages that monitor the presence of vehicles in parking spaces, security sensors connected to a building's burglar alarm, or heat and smoke sensors connecting to a fire alarm system.

BACKGROUND OF THE INVENTION

A number of prior art systems incorporate automated lighting control functions based on input from ambient light or occupancy sensors or electronic timers, but their overall control system implementation does not offer sufficient scale of integrated control, sensor, power, security and lighting management functionality for complex infrastructures nor does it have the ability to incorporate sensory input from items not related to lighting. A lighting control system for a residence is necessarily less complex than one required for a parking garage or an industrial warehouse, but can also be improved by higher levels of system, power, lighting, sensor and control integration.

Some lighting control systems do employ wireless communication and networking, but not at the level of the individual light fixture, and rely instead on wireless control over zones (multiple lights ganged together) of a wired lighting system. This limits the functionality and versatility of said systems because the level of control is more centralized than specific to each independent light fixture. Also the number of channels available for sensors and diagnostics and power management are necessarily limited when a single zone controller is the information bottleneck. For example, lights programmed to a specific illumination during the day, must still be manually or remotely turned to full illumination when insufficient daylight or occupancy or motion is detected locally. Advances in the bandwidth of wireless networking integrated with programmable computer chips make it possible for a lighting fixture or any electrical appliance, such as solar powered parking meters or wellhead monitors in an oil field, to host a multi-functional, networked RF module that accommodates numerous sensors of various types, reacts to their inputs individually or as a network or reports to and receives instructions from remote computers or hand held devices.

Another integration deficiency in simpler lighting control systems is the ability to control the level of illumination locally and specifically. Most lighting control systems only turn lights on or off, and dimming is only actuated manually. Other systems employ manually controlled wired dimmers and some employ wireless control wired dimming of zones, but without wireless dimming control of each fixture based on multiple local sensor input. This general lack of local control limits the ability to manage power usage when an area is unoccupied or illuminated by daylight. Dimming is also not well integrated with motion sensors on individual fixtures or devices to regulate or reduce power consumption when an area is vacant or unused for a length of time. Other systems do not have an individual self-diagnostic capability or the added functionality of analyzing and reporting the power consumption of individual units or RF modules.

Some lighting control systems vary illumination outputs (on/off) based on security system inputs, i.e. when the facility is locked down for the night the security system tells the lighting control system to turn all or most of the lights off. These systems are again controlled from the outside in, and are thereby limited in their versatility and scope. No other lighting system has the ability to actually become a functioning part of a security or fire alarm system rather than simply reacting to signals from these systems.

SUMMARY OF THE INVENTION

The invention provides a Wireless Lighting and Electrical Device Control System with energy efficient dimming and integrated smart sensor networking related to the lighting system itself or to other systems such as parking monitors, fire alarm monitors or security alarm monitors. The system can be advantageous deployed in any residential, commercial or industrial structure or outdoor location where multiple light fixtures or other electrical devices should be turned on, off, brightened or, dimmed, or otherwise reacted to, depending on the arrival, departure, presence or absence of persons, vehicles, or other objects or events to be illuminated or analyzed. The system thus becomes a multifunctional data gathering module connected to a network of similar modules that can perform an extensive number of useful functions relating to its radio interconnectivity and on board intelligence gathering and analytical capabilities.

The Wireless Lighting and Electrical Device Control System is designed to provide an automated wireless independent lighting and electrical device control system which saves power, increases security, generates way finding information, and improves system integration and component reliability for a number of diverse functions. Independent control processing in each lighting fixture or electrical device allows a multiplicity of sensors to be locally employed and their data to control local conditions or communicate to adjoining fixtures and electrical devices and thereby control larger portions of the lighting system network or network to several unrelated systems.

The present invention enables a high level of system integration, versatility, and local control functionality. It provides diagnostic capability and allows for large sensor bandwidth. Wireless networking of sensor data can control illumination at each node, zone, level, or building, as well as communicate real-time status to its own or other local, nearby, online or remote system.

Essentially, the Wireless Lighting and Electrical Device Control System provides a plurality of individually addressable radio frequency (RF) modules, any of which can be installed with any electrical device such as an ambient condition sensor or an ambient condition modifier. A prime example would be a light fixture, whether with or without a dimmable light source. The individually addressable radio frequency modules each have a microprocessor that is programmed (preferably both pre-programmed and re-programmable):

a) to receive and process signals from at least two of the following sensor types: motion detector sensors, occupancy sensors such as sonar transducers, photocell sensors, heat sensors and smoke sensors;

b) to transmit sensor information and dimming command signals to other individually addressable radio frequency modules within the plurality;

c) to receive sensor information and dimming command signals from other individually addressable radio frequency modules within the plurality;

and having a dimming section that processes dimming commands to adjust light power output from the light fixture having the dimmable light source. "Dimming commands" means commands either to dim or to "undim" or increase power output and thereby brightness. Each module is thus capable of installation in and control of a dimmable light source fixture, but can be usefully installed to other purposes in other electrical sensor and condition control devices.

The RF modules can be used in groups, such as for a floor or wing of a building or parking garage, and can be in wireless communication with a central computer for the entire property on which the system is installed. The system would thus have a wireless base control platform, that receives information from and sends commands to the RF modules in different groups or zones of illumination or to control or react to other functions in other types of electrical devices. The wireless base platform would have a programmable microprocessor and a radio frequency transmitter and receiver for transmitting and receiving sensor signals from the individually addressable radio frequency modules regarding a multiplicity of conditions at remote light fixtures or other electrical devices. These would transmit and receive information and/or instructions regarding a multiplicity of conditions comprising at least two of the following set of conditions: individual light fixture illumination power output, ambient light level input, motion, occupancy, temperature, and smoke detection. For example they could send commands to remote light fixtures to increase or decrease illumination in response to information received about such conditions. A plurality of remote light fixtures or other electrical devices each installed with one of the individually addressable radio frequency modules would send sensor signals from the remote light fixtures or electrical devices regarding the multiplicity of conditions at the remote light fixtures or devices, and would receive commands from the radio frequency wireless base platform for the remote light fixtures or devices to increase or decrease illumination or other types of power output. The microprocessor in each RF module would provide a core for an electronic control section. The Wireless Lighting and Electrical Device Control System would thus have:

a) a motion sensing section for receiving and processing signals from remote motion sensors;

b) an ambient light sensing section for receiving and processing signals from remote ambient light sensors or for self-diagnosing and reporting on the operation of an individual light fixture;

c) an electronic control section that receives information from the motion sensing section and from the ambient light section about remote motion events and remote ambient light conditions, applies light dimming decision functions based on information from the motion sensing section and from the ambient light section about remote motion events and remote ambient light conditions, and outputs light control command signals for controlling the light output of individual remote light fixtures;

d) a networking section having a wireless receiver and transmitter for receiving signals from remote or on board motion sensors and remote or on board ambient light sensors and for transmitting light control command signals to individual, radio networked remote light fixtures.

Optimally, a lighting control and Electrical Device module embodying the invention should include a power management section for supplying electrical power to the motion sensing section, to the ambient light sensing section, to the electronic control section, to the occupancy sensors, to the fire alarm sensors, to the security sensors, to other types of sensors and to the networking section. The power management section would preferably have an electrical power source and a two-stage battery backup and charging section, comprising a short-term emergency battery to maintain power output of remote lighting fixtures or other electrical devices in the event of a disruption of electrical power from the electrical power source, and a long-term battery to maintain sensing by sensors at remote light fixtures or devices, signal transmission from remote light fixtures or devices and command transmission to remote light fixtures or devices. The management section would be implemented with the following functional features:

a) a low voltage power supply circuit which supplies electrical power to the motion sensing section, to the ambient light sensing section, to the electronic control section, to the occupancy sensors, to the fire alarm sensors, to the security sensors, to other types of sensors and to the networking section;

b) an AC mains monitoring circuit to enable elements of the system to switch to a backup battery power input when AC mains power is unavailable;

c) a backup battery with a battery charging control circuit to provide emergency lighting and/or necessary system functionality during an AC power outage and a secondary, long term back up battery to provide long term power to the connected sensors and the radio section over a period of several days to continue the monitoring of essential security and other types of data during prolonged power outages;

d) a power monitoring circuit to monitor real-time power consumption of individual lighting fixtures or other electrical devices;

e) a temperature reading circuit to monitor the temperature system elements and issue reports when system elements exceed preset temperature limits to the electronic control section for appropriate commands, including a command to disable overheating elements.

In one preferred embodiment, the Wireless Lighting and Electrical Device Control System would form a large network or system in which:

a) a plurality of remote motion sensors are respectively adjacent to a plurality of light fixtures or other devices at various locations remote from the electronic control section;

b) a remote motion sensor that senses a motion in an area of potential illumination control or other type of electrical response device—such as opening a garage door, for example—would cause a remote light fixture's electronic control section not only to implement a command for increased illumination from that remote light fixture, but also to send a command for increased illumination to other remote light fixtures, all subject to available ambient light level or other types of pre-programmed information;

c) a plurality of remote ambient light sensors are respectively adjacent to a plurality of light fixtures at various locations remote from the electronic control section and provide signals to the ambient light sensing section to enable the electronic control section to send light control commands based in part on ambient light conditions;

d) the electronic control section can be re-programmed to send various lighting or device commands to individual remote light fixtures or any type of electronic device the RFT modules are installed in, including from a remote location or hand held device;

e) there is a plurality of remote occupancy sensors respectively adjacent to remote light fixtures or other electrical devices which send occupancy condition signals to an occupancy sensing section of the electronic control section;

f) the electronic control section, in response to occupancy events in an area of potential illumination or other controllable function by a remote lighting fixture or electrical device, sends lighting control and other commands for different brightness levels or varying instructions depending on different ambient light conditions or other environmental conditions detected by sensors;

g) there is a light dimming module that has multi-channel controls that digitally select different precise illumination levels for a plurality of remote light fixtures;

h) the light dimming module includes a step dimming circuit which defines the precision of dimming steps, and a delay circuit that defines a period after a motion sensor is triggered before a respective remote light fixture is commanded by the electronic control section to change its power state and illumination output;

i) remote light fixtures having respective potentiometer dimming circuits permit local individual external dimming control of a plurality of individual light fixtures.

Some of the advantages of the Wireless Lighting and Electrical Device Control System include but are not limited to power conservation; security system augmentation; wireless light dimming control; emergency lighting functionality; timing control for light dimming; seamless and inexpensive system expansion; decentralized component control; real-time intruder tracking; adaptability to any dimming lighting fixture; remote and self monitoring and self-diagnostic capabilities.

The Wireless Lighting and Electrical Device Control System can be employed in any temporary or permanent structure; residential, commercial or industrial or outdoors. Some examples include a hospital, or school, a parking garage, a warehouse or an airport or a network of solar powered parking meters. Full implementation of the many advantages of the Wireless Lighting and Electrical Device Control System would be enjoyed in large complex multi-level, multi-user, structures or outdoors, which require a multitude of lighting fixtures or other electrical devices as well as security and emergency lighting or power supply functionalities.

BRIEF DESCRIPTION OF THE DRAWINGS

FIG. 2c shows a top view of a representative dome style lighting fixture without its dome and showing its LED Plate/Collar.

FIG. 2d shows a top view of a representative dome style lighting fixture without its dome and showing its internal control elements.

FIG. 3a shows a side view of a representative high bay style lighting fixture without its diffuser/shield and including external sensors.

FIG. 3b shows an end view of a representative high bay style lighting fixture with its diffuser/shield and external sensors.

FIG. 4 shows a plan view of a representative parking garage level as a vehicle enters its first zone, with each zone wirelessly communicating to the next, causing all lighting on that level to be turned to a pre-determined brightness.

FIG. 4a shows the driver's view of the level occupancy display showing the nearest zone with a vacant parking bay.

FIG. 5 shows a plan view of several representative parking zones as a vehicle locates a vacant parking bay by means of occupancy indicators.

FIG. 7 is a flowchart outlining basic lighting control functions and their required operational triggers.

DETAILED DESCRIPTION

All relevant elements of the Wireless Lighting and Other Electrical Device Control System will now be introduced by reference to appended figures, and then how each element functions and interacts with each other element will be described herein.

Figure 1:
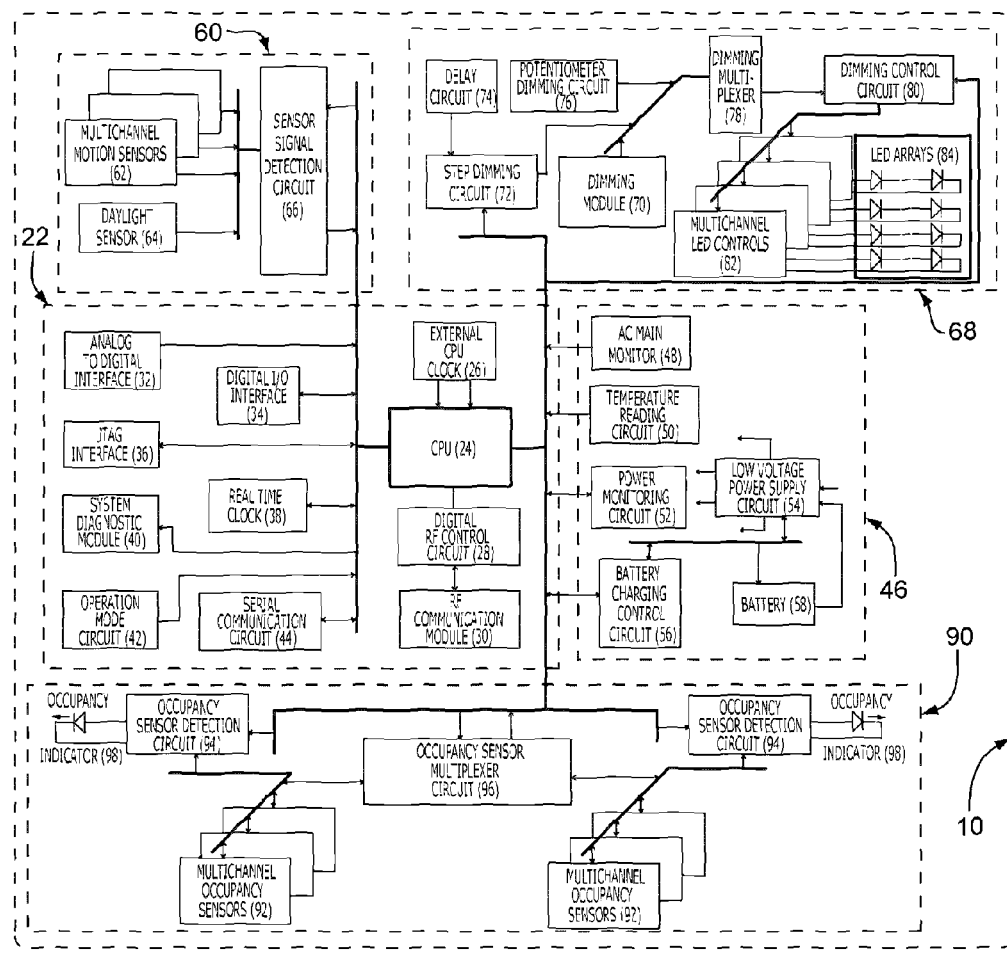
FIG. 1 is a representative block diagram illustrating control, networking, sensor, dimming and power circuit sections of the disclosed Wireless Lighting and Electrical Device Control System.

FIG. 1 is a representative block diagram illustrating interconnected sections of the Wireless Lighting and Electrical Device Control System 10 relating to control & networking 22, power management 46, motion/daylight sensing 60, dimming functions 68, and occupancy sensing 90. Elements of each section will now be listed and briefly described separately herein.

Figure 2A:
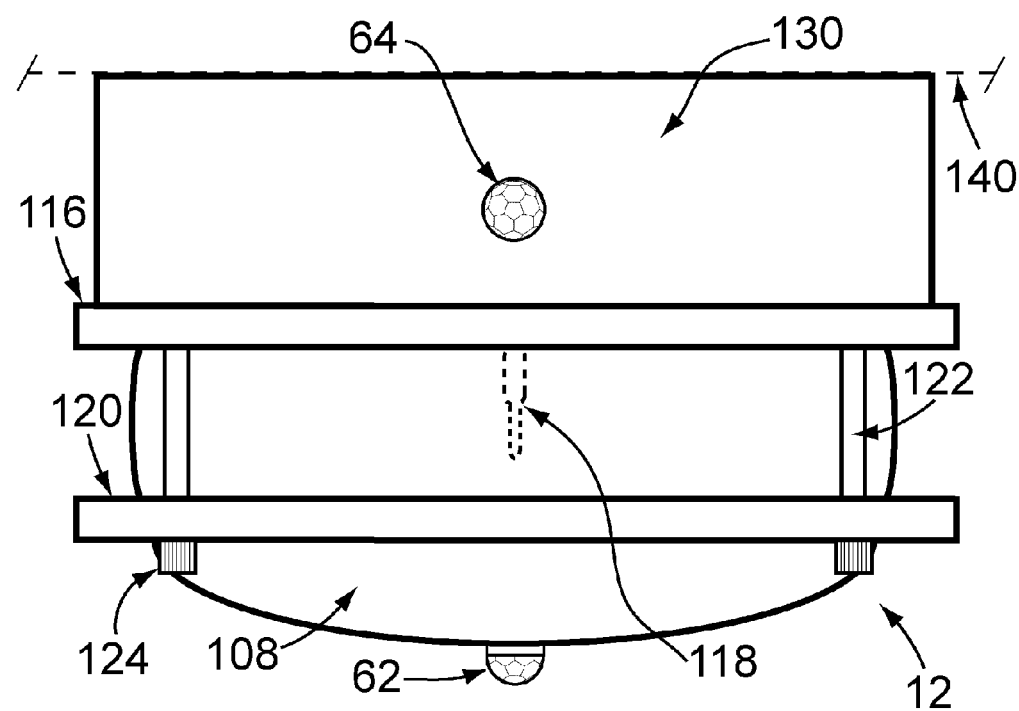
FIG. 2a shows a side view of a representative dome style lighting fixture and its external elements.
Figure 3C:
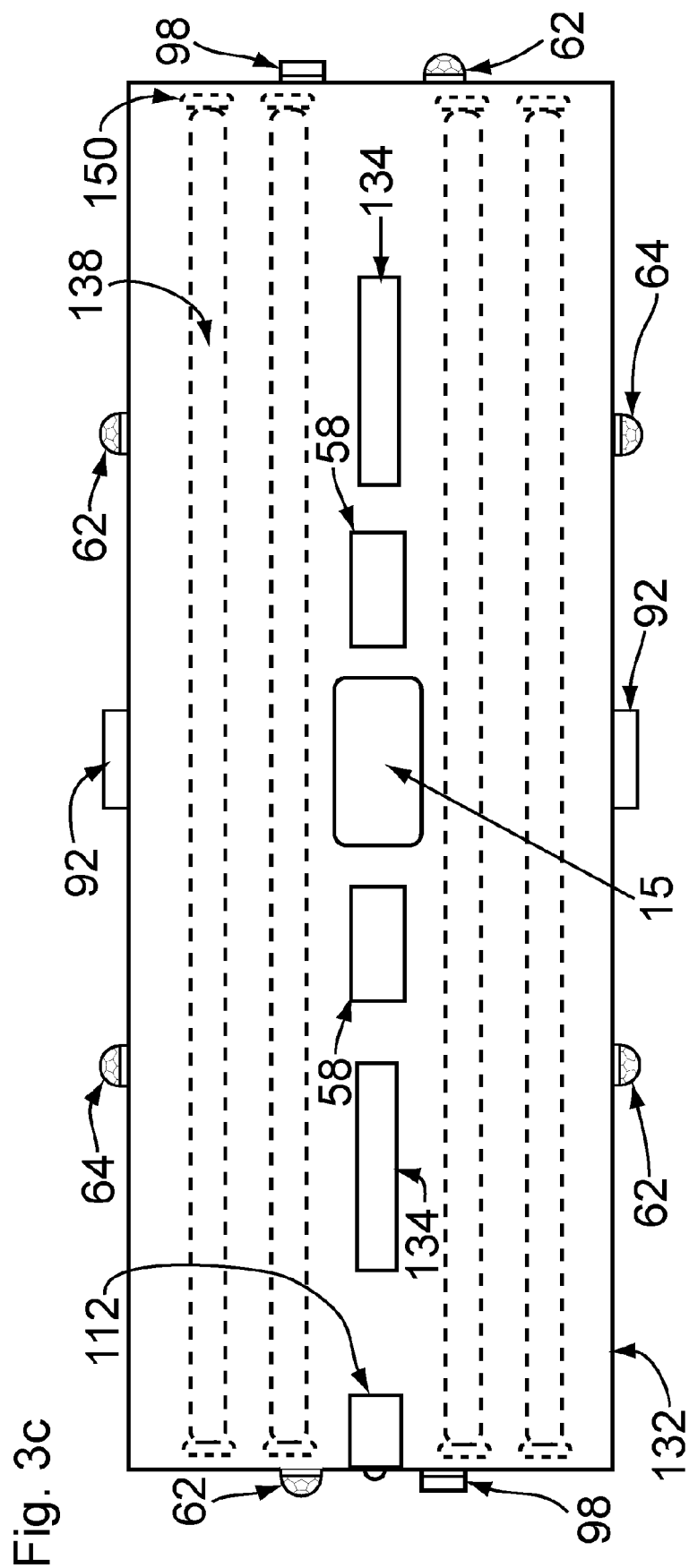
FIG. 3c shows an inside view of the base of a representative high bay style lighting fixture with its ballast coverplate removed and showing the control electronics and external sensors.

Control & Networking:

The core of control & networking 22 is the CPU 24, a programmable computer IC specifically designed to perform all lighting control and networking functions onboard each independent lighting fixture (12 or 14, see FIGS. 2a & 3c). The CPU 24 requires an external CPU clock 26 for cycle timing and an accurately set real time clock 38 for record keeping. The CPU 24 can be switched into different operational states by the operation mode circuit 42 and monitored or adjusted by a system diagnostic module 40. The CPU 24 interacts with the outside world via a digital I/O interface 34, a serial communication circuit 44, a JTAG interface 36 (a processor debugging standard), and an analog/digital interface 32. The CPU 24 interacts with the control system network (via nearest node 16) with its digital RF control circuit 28 and RF communication module 30, the latter using its RF antenna 118 (see FIGS. 2a, c, d)

Power Management:

The power management 46 section includes a low voltage power supply circuit 54 which supplies power to all electronic control, networking and sensing elements of the system 10. This section 46 also includes an AC mains monitoring circuit 48 to allow the system to switch to a backup battery 58 when the mains power is unavailable. The backup battery 58 is maintained at full capacity by its battery charging control circuit 56, and can provide emergency lighting and necessary system functionality during a power outage. Real-time power consumption of each lighting fixture is monitored by the power monitoring circuit 52, and the temperature reading circuit 50 ensures that any system element that exceeds preset temperature limits are reported, and if necessary, disabled over wireless communication channels.

Motion/Daylight Sensing:

The motion/daylight sensing section 60 provides sensor data for the sensor signal detection circuit 66 from multi-channel motion sensors 62 or daylight sensors 64. Daylight sensors 64 respond to ambient illumination so that local area lights can be dimmed or turned off if there is sufficient daylight available and to conserve power. Multi-channel motion sensors 62 detect motion around the lighting fixture 12/14 (i.e. its zone 18), which enables the system 10 to turn on lights in both the local zone 18 and surrounding zones 18, or an entire level 20, depending on how the system 10 is programmed.

Dimming Functions:

The dimming section 68 may be used to digitally select the precise illumination level of LED arrays 84 by means of multi-channel LED controls 82, or fluorescent lights 88 by means of multi-channel fluorescent controls 86. Incandescent lamps, high intensity discharge lamps, induction lights or any other lighting technology with bi-level or multi-level dimming options can similarly be controlled by the dimming control section 68. This section 68 is comprised of a dimming module 70 feeding a dimming multiplexer 78 which distributes light level instructions to a dimming control circuit 80 which commands multi-channel LED controls 82 to vary the light levels of each LED array 84. The dimming module 70 includes a step dimming circuit 72 which defines the precision of dimming steps, while the delay circuit 74 defines the period after a motion sensor 62 is triggered before the lights are returned to their low power state. A potentiometer dimming circuit 76 permits local external dimming control.

Occupancy Sensing:

The occupancy sensing section 90 detects if a specific area or zone is occupied 152 or vacant 154 by means of an occupancy sensor 92 (an ultrasonic transducer). Data from multi-channel occupancy sensors 92 is sent to an occupancy sensor multiplexer circuit 96 which then allows the system 10 to pass this information to a level occupancy display 106 (see FIGS. 4 & 4a) or to external monitoring facilities. The occupancy status of each zone 18 as detected by occupancy sensors 92 is also indicated by an occupancy sensor detection circuit 94 activating an occupancy indicator 98 (LED or other means) on each light fixture (see FIG. 5).

FIG. 2a shows a side view of a representative dome style lighting fixture 12, its external physical elements and one internal element. The dome fixture 12 is shown attached to the ceiling of a residential or institutional corridor or room by the underside of its base 130. A translucent glass, polycarbonate or similar material dome is fastened to the rim 146 (see FIG. 2d) of the base 130 by means of a circular collar 120 and a circular LED plate/collar 116 by means of at least three collar posts 122 and their post fasteners 124 as shown. A daylight sensor 64 is shown attached to the side of the base 130 and a motion sensor 62 is shown attached to the center of the dome 108. Also shown is an RF antenna protruding through the LED Plate/Collar 116 from the inside of the dome fixture base 130. (see FIGS. 2c/d)

Figure 2B:
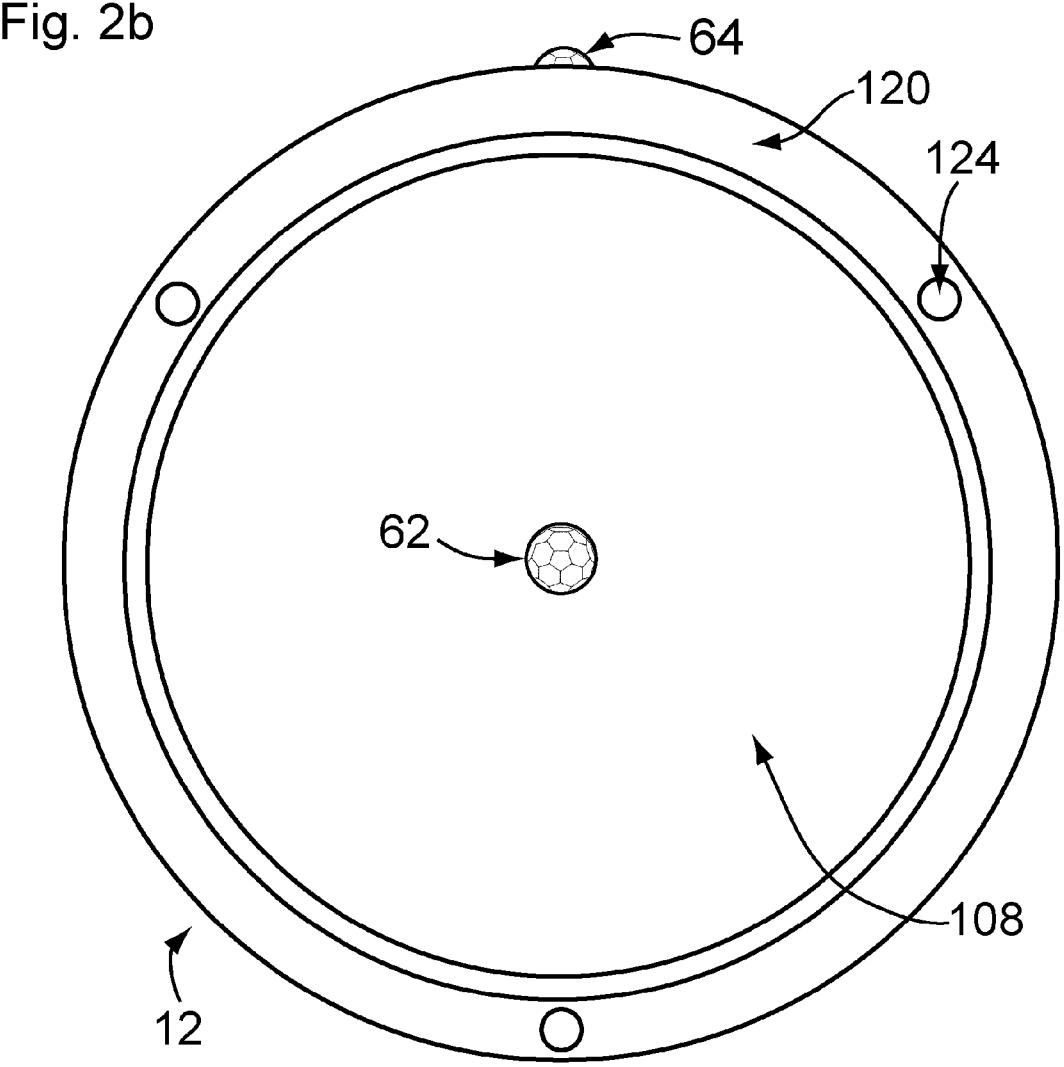
FIG. 2b shows a top view of a representative dome style lighting fixture with its external dome in place.

FIG. 2b shows a top view (i.e. as viewed from someone standing underneath a ceiling mounted fixture) of a representative dome style lighting fixture 12 with its external elements and dome 108 in place, secured by the dome collar 120 by post fasteners 124. Also visible are the motion sensor 62 and daylight sensor 64.

FIG. 2c shows a top view of a representative dome fixture 12 without its dome 108 and showing the top of the LED Plate/Collar 116 fastened to the dome fixture base 130 by collar posts 122. The LED Plate/Collar 116 is shown supporting individual LED strips 126 with a number of LEDs 146 constituting a single unit of illumination control. Also shown is an antenna port 142 which permits the RF antenna 118 to protrude from the RF communication module 30 inside the base 130 through the LED Plate/Collar 116 into the area inside the dome 108. Also shown is the daylight sensor 64. Note that the layout of LED strips 126 shown in FIG. 2c is merely an example of one possible layout, including the number of LEDs 146 employed and their potential groupings. All of these factors will be determined by the layout of each fixture including their lighting, power and control requirements.

FIG. 2d shows a top view of a dome fixture base 130 with its internal lighting control and power elements, namely the control electronics PCB 15, its RF communication module 30, and its RF antenna 118; and a backup battery 58. Also shown are post holes 148 to fasten collar posts 122 to the rim 146 of the base 130.

FIG. 3a shows a side view of a representative high bay style lighting fixture 14 such as those commonly used in parking garages, without its diffuser/shield 110 (see FIG. 3b), exposing its fluorescent tubes 138 supported from tube holders 150 attached to a ballast cover plate 136 fastened to the fixture base 132. External elements of the Wireless Lighting and Electrical Device Control System include multiple motion sensors 62, one or more daylight sensors 64, one occupancy sensor 92 for each side being monitored, and one occupancy indicator 98 for each direction normally visible.

FIG. 3b shows an end view of a representative high bay style lighting fixture 14 with its diffuser/shield 110, exposing its fluorescent tubes 138 supported from tube holders 150 attached to a ballast cover plate 136 fastened to the fixture base 132. External elements of the Wireless Lighting and Electrical Device Control System include multiple motion sensors 62, one or more daylight sensors 64, one occupancy sensor 92 for each side being monitored, and one occupancy indicator 98 for each direction normally visible. The lens of the optional video/photo capture device 112 is shown as well.

FIG. 3c shows an inside view of the high bay fixture base 132 of a representative highbay style lighting fixture 14 with its ballast cover plate 136 removed and showing the control electronics 15 (and optional backup batteries 58) of the disclosed Wireless Lighting and Electrical Device Control System 10. It may be assumed that each external element is electrically connected to the control electronics 15 package. External elements include aforementioned motion sensors 62, daylight sensors 64, occupancy sensors 92 and occupancy indicators 98. Also shown for context are ballasts 134 for the fluorescent tubes 138 supported by their holders 150. The body of the optional video/photo capture device 112 is shown as well.

FIG. 4 shows a plan view of a representative parking garage 156 level 20 as a vehicle 102 triggers the first node's 16 motion detector field 160. The vehicle's 102 entry causes all lighting on the level 20 to be turned to a pre-determined brightness because each node 16 is capable of wireless communication 128 with the next. A level occupancy display 106 affixed to the first pillar 104 of the level 20 also shows the vehicle 102 driver the nearest zone 18 with a vacant parking bay 100 by displaying solid squares for zone occupied 152 and empty squares for zone vacant 154. In case the nearest spot is not the only consideration for where to park, the driver can also see where the vacant zone 154 is located by means of the occupancy indicator on the fixture 14 over the zone 18 displaying a zone vacancy 154. A common color schema is to use a red light to indicate zone occupancy 152 and green for zone vacancy 154, but the use of other colors, such as amber to indicate disabled parking, are not ruled out depending on the traffic indicator standards of the country where the Wireless Lighting and Electrical Device Control System 10 is installed.

FIG. 4a shows a close-up of the driver's view of the level occupancy display 106 showing solid squares for zone occupancy 152 and empty squares for zone vacancy 154.

FIG. 5 shows a close-up plan view of several representative parking bay 100 zones 18 with each fixture 14 employing occupancy sensors 92 to monitor the assigned parking bays 100 within their occupancy field, and to indicate a vacancy 154 or full occupancy 152, where appropriate. The driver of the vehicle 102 is shown passing the occupied zone 152 and is readily approaching the zone with a vacancy 154 by means of the occupancy indicator 98.

Figure 6:
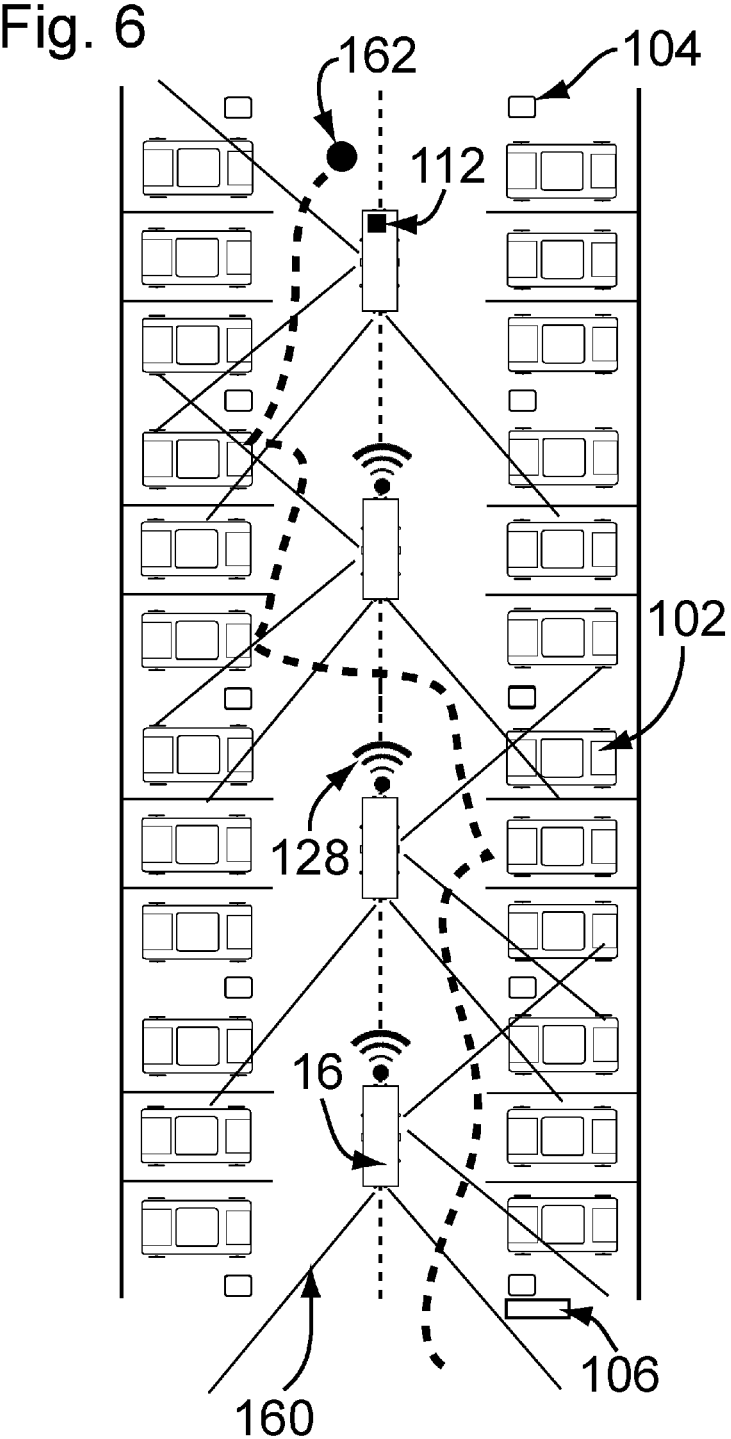
FIG. 6 shows how an intruder's movements can be wirelessly tracked or their identity image captured by the triggering of each node's motion sensors while a facility is in lock-down mode.

FIG. 6 shows how an intruder's 162 movements can be wirelessly tracked or identity image captured by a video/photo capture device 112 during a facility lock-down mode. As the intruder 162 passes into the area around each node 16 their movement triggers a specific motion sensor 62 as they pass through its detection field 160. Because the facility is supposed to be secured, the lights are not turned on when a motion sensor 62 is triggered and because they would reveal that the intruder's 162 movements have been discovered. By this means, the Wireless Lighting and Electrical Device Control System 10 can augment and expand an existing intruder detection system. Note that the video/photo capture device 112 may only present as a small lens on the outside of the fixture 12/14 and may be best employed at fixtures at entry and egress of each level 20. Because each node 16 is in wireless communication 128 with the next, damage to a camera in one fixture 14 would not prevent transmission of video/photo capture data throughout the network and to monitoring agencies.

FIG. 7 is a flowchart outlining basic lighting control functions/advantages and their required operational triggers. The four nominal functional outcomes [F1 to F4] include wireless lighting control [F1], logically divided into two states of Maximum Brightness 164 or selectable Dimming 182; Emergency Lighting/Power Management 166 [F2]; Security Detection 168 [F3]; and Energy Efficiency/Occupancy Sensing 170. Two external factors that trigger control functions are the level of ambient daylight 178 as detected by the daylight sensor 64 in each fixture; and whether the AC mains power 176 has been lost and when it has been restored. Four factors that are controlled by the manager or programmer of the Wireless Lighting and Electrical Device Control System 10 include a wireless master command 172; a pre-programmed automatic timer signal 174; a timer signal 174 that can only be validated by a master command 172; and a wired manually operated dimmer switch 180. FIG. 7 illustrates how each function may be conditionally triggered by these external environmental factors or by intentional operator selection(s). Refer to the section on Control Functions and Triggers for an outline of how these elements interact.

A preferred embodiment of the Wireless Lighting and Electrical Device Control System 10 will now be described in detail. Note that any lighting fixtures discussed in this disclosure are merely representative examples of the many possible lighting enclosures and lighting systems in which we may implement our novel Wireless Lighting and Electrical Device Control System 10. Also note that to implement our system 10 into each unique fixture and lighting system will have its own unique requirements, and these solutions are included as part of the intended objects of this invention.

Overview:

The Wireless Lighting and Electrical Device Control System 10 can be used for general lighting control, to augment a security system, supply emergency lighting or emergency power and for monitoring the presence or absence of specific objects. This versatile, multi-functional innovation concerns the electronic control of individual lighting fixtures or other electrical devices via radio frequency for the purpose of saving energy and extending lamp life. It also enables each light fixture to be individually addressable and remotely monitored or controlled as each fixture incorporates self-diagnostic capabilities so that it can report internal problems and monitor its own power consumption in real time.

An on-board programmable computer chip, which is a component within each fixture or electrical device, is capable of initiating or interpreting radio signals and/or sensory inputs from several types of built-in or attached sensors such as; motion detectors, occupancy sensors, photocells and/or other sensing devices that are housed within the fixture, attached to the fixture or relayed via R/F from similar fixtures with similar or different sensors within a given network. These sensory inputs will interact to control and time the illumination level of the light fixture or some other function or another electrical device itself as well as all the fixtures or devices within that network. Each fixture or device will also relay the information to a remote computer which is programmed to monitor and control all the lights or devices within the network or a group of networks.

The remote computer can also use the relayed information to perform other functions such as having the network of fixtures or devices become a stand-alone security system or occupancy monitoring system. The remote computer can also couple this information to extend the range of a building's security system. As each fixture's address and location can be mapped, the system is capable of tracking an intruder and registering the time of the intrusion. The remote computer can also gather information from other types of sensors to perform other specific tasks as detailed below.

In the case of lighting fixtures in a parking garage or similar structure, the light fixtures themselves are programmed to operate in a dimmed mode for the majority of the time thus conserving energy when no motion is present. If a built-in or attached motion detector detects movement that fixture will ramp up to a pre-determined brightness and signal all the fixtures in its own designated network to do the same. If movement is detected by any other fixture within the same network they will react in the same way. Each fixture could also be equipped with a photocell that would turn off individual fixtures when there is daylight present and signal others to do likewise. Certain fixtures would also be equipped with battery packs that would allow them to become emergency lights (operating in the dimmed mode)

in the event of a power outage and their light levels would comply with regulations concerning the timing and light level maintenance as set down by building codes concerning the means of egress from public buildings.

This technology can be applied to lighting systems with multi-level dimming features using incandescent lamps, LED's, fluorescent bulbs, High Intensity Discharge lamps, induction lights or any other lighting technology with bi-level or multi-level dimming options. For dimming LED's the device utilizes several specialized driver chips capable of electronically dimming multiple channels as shown in FIG. 1.

As mentioned before, each fixture or device is also designed to house or support one or more occupancy sensors that would be directed into designated spaces to report if those spaces were occupied or vacant. This information would also be transmitted via R/F to a central computer that would count, map and report the location of the full or empty spaces. Colored LED's attached to each light fixture would signal the presence or absence of an object in an individual space or objects within a group of spaces.

While the dome fixture 12 is one preferred implementation of the Wireless Lighting and Electrical Device Control System 10 as it may be employed in rooms, hallways, residences, hospitals, and other structures with limited range requirements, the high-bay fixture 14 is more appropriate for use in industrial & commercial settings, including parking garages 156. Since the latter implementation teaches more about the many capabilities and advantages of the Wireless Lighting and Electrical Device Control System 10, this setting will be used to demonstrate the invention. (See FIGS. 3a/c, 4-6)

Parking Garage Implementation:

As shown in FIG. 4, when a vehicle 102 enters a level 20 of a parking garage 156 all the lights would be dimmed. The motion detector 62 on the first light fixture it passes would be activated thus switching that fixture to a pre-determined brightness. At the same time the first fixture will initiate wireless communication 128 to all the other light fixtures on the level 20 with the command to ramp up to a pre-determined brightness.

A programmable timing function controlled by the computer chip housed on the circuit board (device) within each fixture would be activated simultaneously so that all those lights would continue to operate at a pre-determined brightness for a pre-set period of time after all motion within that sector ceases. If the occupants of a vehicle remain within their conveyance until all the lights in their sector are restored to their dimmed level the motion of opening the car's doors and their stepping outside the vehicle will activate the motion detector on the light fixture nearest them and once again all the lights in their sector will receive a radio signal to come up to a pre-determined brightness and remain at that level until a timed period after they are in the elevator or on the stair case and safely out of that sector.

If there is enough natural light present in an above ground parking structure a photocell (daylight sensor 64) on each fixture will turn it off to save energy. This is also controlled by the computer chip housed on the circuit board of the device within those fixtures. The sensitivity of these photocells on one or a group of fixtures could be adjusted or changed via a remote computer.

The computer chip on the circuit board within each fixture is also capable of receiving, interpreting and transmitting information received by one or more sonar occupancy sensors. These sensors would be mounted in the fixture or remotely attached to the fixture and be aimed into each parking space. The occupancy sensors would signal the computer chip when the space became occupied. The computer chip would be programmed to respond by turning on or off colored LED's attached to that fixture or the remote sensor so it was visible to the drivers of vehicles entering that sector of the structure. This information would also be relayed to a remote computer which would count and map the full and empty spaces and display this information on computer screens or LED readouts at the entrance of the parking structure or pivotal points within the structure to inform drivers of the availability and whereabouts of empty parking spaces. This information could also be used to monitor or time how long a vehicle was in a given parking space and relay this information to security guards or parking attendants and/or couple this information to a payment system.

Control Functions and Triggers:

The following decision tree outlines how specific control functions may be triggered by specific input or data states. (see FIG. 7)

Control Functions:

1. Wireless Dimmable Lighting Control (F1): Fully automated lighting system for general lighting using white LEDs or fluorescent tubes or any other type of lighting device with dimming capabilities or high/low switching. Multi-functional, adaptive, energy efficient with networking capability based on a central master, multi-master, multi-slave wireless network & hard wired 0-10v dimming or bi-level switching.

2. Emergency Lighting/Power Management (F2): Emergency lighting system with self-monitoring functions, automatic power outage detection plus battery-pack monitoring and charging capabilities.

3. Autonomous Security Augmentation (F3): Stand-alone security system using motion & occupancy sensors or via an automatic function switch, information from those sensors can be tied into a building's security system, thus producing a no blind-spot, remote connection over wireless communication channels 4. Energy Efficiency/Occupancy Sensing (F4): Energy-efficient garage lighting system while monitoring real-time parking space availability through its occupancy sensors, all of which is remotely controlled over wireless communication channels.

Terminology:

Central master—unique master controlling the entire network; including its own slaves, sub-masters under it and the sub-masters' slaves.

Master—any sub-master being controlled by the central master. A sub-master or sub-sub-master acts as a backup for the central master or sub-master if it fails.

Slaves—devices working under the control of the central master or under masters or sub-masters. A slave can sometimes acts as a backup for the master or sub-master if either fails.

Triggers:

Triggers to Implement Function #1 (Related to Functions above)

1. Ambient light level below the pre-programmed threshold in the on board ambient light detection circuit, either master or slaves fixtures 2. Command/instruction sent over radio by central master to the slaves/or group of slaves or by wire from the 0-10v dimming controller 3. On board real-time clock-triggered signal 4. AC main voltage restored after power outage event Function #1 to Function #2 Trigger 1. AC main/power outage event or command/instruction received wirelessly from the master
Function #1 to Function #3 Triggers
  1. Command/instruction sent over radio by central master
  2. On board real-time clock validated by instruction from master
Function #1 to Function #4 Triggers
  1. Command/instruction sent over radio by central master
Function #2 to Function #1 Triggers
  1. AC main voltage restored after power outage event
  2. Command/instruction sent over radio by central master
Function #3 to Function #1 Triggers
  1. Command/instruction sent over radio by central master
  2. On board real-time clock validated by instruction from master Other advantages of using the Wireless Lighting and Electrical Device Control System over other methods or devices will now be described:

Projected typical 50% energy savings with lights set to half bright when area unoccupied; lights return to half brightness after programmable delays. PCB mounted high intensity LEDs are very reliable and save energy, providing a long-term light source. Real-time power consumption monitoring where each fixture or device relays its power consumption of the LEDs and the entire fixture or device, or the entire network or system enabling stakeholders to accurately determine their energy savings or detect malfunctioning units. If individual LEDs, other lighting systems or alternate devices become defective, the lower power consumption will be detected and the failure pinpointed so that a unit can be quickly located, repaired or replaced. (i.e.: self-diagnosing feature).

Since fixtures and devices are addressable with a unique identifier, the location of the nearest empty space can or could be wirelessly sent to a vehicle's onboard digital GPS navigation system, pointing the driver to the nearest empty parking bay in real time.

An existing security system can be augmented by employing fixture sensors as additional motion detectors for areas where there are none. System can be used in warehouses to detect if a pallet is in a certain space. Other installations may include monitoring devices above a wellhead or water main or in a wind turbine on a wind farm.

Dimming module allows users to set precise and localized light levels by means of remote programming & networking. The 0-10V dimming standard allows an operator to program the level of light required across a network or system, or for each fixture. Dimming can also be done by means of a rheostat.

When using LED fixtures, a current sensor on the motherboard will detect when an LED strip is inactive or decreased, indicating that at least one LED or all the LED's have ceased functioning.

When the motion detector attached to one fixture senses movement, it signals to the master fixture of a group, and the master signals to all fixtures in the group which are instantly all turned up to a pre-determined brightness. Effective range between networking fixtures can be up to 200 meters in a line of sight. Isolated optical, insulated electronics create the situation where Networking & RF I/O are still possible under high tension wires.

A primary use for the system would be to provide energy efficiency by operating various lighting components of a building or parking garage's lights to operate in a dimmed mode for large blocks of time and then brighten them for a limited time when ambient light was low but no motion detected. However the system as described is so versatile it could be used to detect the presence or absence of cars in individual parking spaces, the status of these parking spaces, and accommodate other components of functioning security systems with dependable, long term, reporting capabilities. The Wireless Lighting and Electrical Device Control System could thus be tied to computer screens at various levels in a parking garage to inform drivers of empty parking spaces and direct them via maps and LED indicators as well as functioning as part of a security or fire alarm system.

The RF modules operate in groups or zones and can communicate with others within their zones or with adjoining zones. They provide a multi-function capability by making the light fixture a data gathering and processing point, and would support functions such as digital photography for security purposes, such as for photographing license plates as cars enter an indoor or outdoor parking lots, or for recording (monitoring) the transponder ID's of authorized vehicles or pedestrians. The system could tie into a building's fire alarm or intruder security system or react to and respond to signals from systems that have nothing to do with lighting, such as occupancy measurements and integrating with parking meters for pay parking monitoring in parking lots. The system's RF modules can be installed not only in any dimmable light source such as LED's, fluorescents or Induction lights, but also anywhere there is an electrical current present such as in solar powered parking meters or wind turbines. If built into lights, the lights themselves become communication centers for the entire building or exterior illumination zone.

Each module can contain self-diagnostic functions so it could report internal problems and its own location. Each module could not only communicate with other modules but would communicate to a central computer located either within the same complex or elsewhere, or with a local or remote hand-held device.

The foregoing description of the preferred apparatus and method of installation should be considered as illustrative only, and not limiting. Equivalent electronic circuits or components and other materials may be employed towards similar ends. Various changes and modifications will occur to those skilled in the art, without departing from the true scope of the invention as defined in the above disclosure, and the following general claims.

We claim:

1. A wireless lighting and electrical device control system comprising a plurality of individually addressable radio frequency modules for installation in a plurality of respective remote electrical devices the individually addressable radio frequency modules each having a microprocessor that is programmed:
  a) to receive and process signals from at least two of the following sensor types: motion detector sensors, occupancy sensors, photocell sensors, heat sensors and smoke sensors;
  b) to transmit sensor information and electrical device command signals to other individually addressable radio frequency modules within the plurality;
  c) to receive sensor information and electrical device command signals from other individually addressable radio frequency modules within the plurality;
  the individually addressable radio frequency modules each having a dimming section that processes dimming commands and that can control illumination from a light source when installed in a light fixture having a dimmable light source among the remote electrical devices; and further comprising an electrical power source and a two-stage battery backup and charging section, comprising a short-term emergency battery to maintain power output of remote electrical devices in the event of a disruption of electrical power from the electrical power source, and a long-term battery to maintain sensing by sensors, signal transmission from remote electrical devices and command transmission to remote light fixtures among the electrical devices.

2. The wireless lighting and electrical device control system of claim 1, further comprising: a) a wireless base control platform for a group of zones of illumination, having a programmable microprocessor and a radio frequency transmitter and receiver for receiving sensor signals from the individually addressable radio frequency modules regarding a multiplicity of conditions at the electrical devices, the multiplicity of conditions comprising at least two of the following set of conditions: individual light fixture illumination power output, ambient light level, motion, occupancy, temperature, and smoke detection, and for sending commands to remote light fixtures to increase or decrease illumination; b) a plurality of remote electrical devices each installed with one of the individually addressable radio frequency modules for sending sensor signals from the remote electrical devices regarding the multiplicity of conditions at the remote electrical devices, and for receiving commands from the radio frequency wireless base platform for remote light fixtures among the electrical devices to increase or decrease illumination power output.

3. A wireless lighting and electrical device control system, comprising a plurality of individually addressable radio frequency modules for installation in a plurality of respective remote electrical devices the individually addressable radio frequency modules each having a microprocessor that is programmed:
 a) to receive and process signals from at least two of the following sensor types: motion detector sensors, occupancy sensors, photocell sensors, heat sensors and smoke sensors;
 b) to transmit sensor information and electrical device command signals to other individually addressable radio frequency modules within the plurality;
 c) to receive sensor information and electrical device command signals from other individually addressable radio frequency modules within the plurality; the individually addressable radio frequency modules each having a dimming section that processes dimming commands and that can control illumination from a light source when installed in a light fixture having a dimmable light source among the remote electrical devices;
 in which the individually addressable radio frequency modules each have: a) a motion sensing section for receiving and processing signals from remote motion sensors; b) an occupancy sensing section for receiving and processing signals from remote occupancy sensors; c) a heat and smoke sensing section for receiving and processing signals from remote heat and smoke sensors; d) an ambient light sensing section for receiving and processing signals from remote ambient light sensors: e) an electronic control section that receives information from the motion, occupancy, heat smoke, and ambient light sensing section about remote motion, occupancy, heat, smoke and temperature events and remote ambient light conditions, applies light dimming decision functions based on information from the motion sensing section and from the ambient light section about remote motion events and remote ambient light conditions, and outputs light control command signals for controlling the light output of individual remote light fixtures.

4. The wireless lighting and electrical device control system of claim 3, further comprising: a) a wireless base control platform for a group of zones of illumination, having a programmable microprocessor and a radio frequency transmitter and receiver for receiving sensor signals from the individually addressable radio frequency modules regarding a multiplicity of conditions at the electrical devices, the multiplicity of conditions comprising at least two of the following set of conditions: individual light fixture illumination power output, ambient light level, motion, occupancy, temperature, and smoke detection, and for sending commands to remote light fixtures to increase or decrease illumination; b) a plurality of remote electrical devices each installed with one of the individually addressable radio frequency modules for sending sensor signals from the remote electrical devices regarding the multiplicity of conditions at the remote electrical devices, and for receiving commands from the radio frequency wireless base platform for remote light fixtures among the electrical devices to increase or decrease illumination power output.

5. The wireless lighting and electrical device control system of claim 1, 2, or 3, further comprising a power management section for supplying electrical power to the motion sensing, occupancy sensing, heat sensing, smoke sensing, temperature sensing and other types of sensing sections, to the ambient light sensing section, to the electronic control section, and to the networking section.

6. The wireless lighting and electrical device control system of claim 5, in which the power management section includes a low voltage power supply circuit which supplies electrical power to the motion, occupancy, smoke, heat and temperature and other types of sensing sections, to the ambient light sensing section, to the electronic control section, and to the networking section.

7. The wireless lighting and electrical device control system of claim 6, in which the power management section includes an AC mains monitoring circuit to enable elements of the system to switch to a backup battery power input when AC mains power is unavailable.

8. The wireless lighting and electrical device control system of claim 7, in which the power management section maintains a backup battery with a battery charging control circuit to provide emergency lighting and necessary system functionality during an AC power outage.

9. The wireless lighting and electrical device control system of claim 5, in which the power management section includes a power monitoring circuit to monitor real-time power consumption of individual electrical devices.

10. The wireless lighting and electrical device control system of claim 7, in which the power management section includes a temperature reading circuit to monitor the temperature system elements and reports when system elements exceed preset temperature limits to the electronic control section for appropriate commands, including a command to disable overheating elements.

11. The wireless lighting and electrical device control system of claim 5, further comprising a plurality of remote motion sensors.

12. The wireless lighting and electrical device control system of claim 11, in which a plurality of remote motion sensors are respectively adjacent to a plurality of light fixtures at various locations remote from the electronic control section.

13. The wireless lighting and electrical device control system of claim 12, in which a remote motion sensor that senses a motion toward an area of potential illumination for a remote light fixture or electrical device causes the electronic control section to send a command for increased illumination power output from the remote light fixture, subject to available ambient light level information.

14. The wireless lighting and electrical device control system of claim 5, further comprising a plurality of remote ambient light sensors.

15. The wireless lighting and electrical device control system of claim 14, in which a plurality of remote ambient light sensors are respectively adjacent to a plurality of light fixtures at various locations remote from the electronic control section.

16. The wireless lighting and electrical device control system of claim 13, in which a plurality of remote ambient light sensors provide signals to the ambient light sensing section to enable the electronic control section to send light control commands based in part on ambient light conditions.

17. The wireless lighting and electrical device control system of claim 2 or 4, in which the programmable microprocessor can be re-programmed to send various lighting commands to individual remote light fixtures.

18. The wireless lighting and electrical device control system of claim 5, in which the electronic control section, in response to occupancy events in an area of potential illumination by a remote lighting fixture, sends Lighting control commands for different brightness levels depending on different ambient light conditions.

19. The wireless lighting and electrical device control system of claim 18, in which a plurality of remote occupancy sensors respectively adjacent to remote light fixtures sends occupancy condition signals to an occupancy sensing section of the electronic control section.

20. The wireless lighting and electrical device control system of claim 1, 2, or 3, further comprising a light dimming module having multichannel controls that digitally select different precise illumination levels for a plurality of remote light fixtures.

21. The wireless lighting and electrical device control system of claim 20, in which the light dimming module includes a step dimming circuit which defines the precision of dimming steps, and a delay circuit that defines a period after a motion sensor is triggered before a respective remote light fixture is commanded by the electronic control section to change its power state and illumination output.

22. The wireless lighting and electrical device control system of claim 21, in which remote light fixtures have respective potentiometer dimming circuits that permit local individual external dimming control of a plurality of individual light fixtures.

23. The wireless lighting and electrical device control system of claim 5, in which the power management section includes: a) a low voltage power supply circuit which supplies electrical power to the motion sensing section, to the ambient light sensing section, to the electronic control section, and to the networking section; b) an AC mains monitoring circuit to enable elements of the system to switch to a backup battery power input when AC mains power is unavailable; c) a backup battery with a battery charging control circuit to provide emergency lighting and necessary system functionality during an AC power outage; d) a power monitoring circuit to monitor real-time power consumption of individual lighting fixtures; e) a temperature reading circuit to monitor the temperature of system elements and reports when system elements exceed preset temperature limits to the electronic control section for appropriate commands, including a command to disable overheating elements.

24. The wireless lighting and electrical device control system of claim 3 or 4, in which: a) a plurality of remote motion sensors are respectively adjacent to a plurality of light fixtures at various locations remote from the electronic control section; b) a remote motion sensor that senses a motion toward a area of potential illumination for a remote light fixture causes the electronic control section to send a command for increased illumination from the remote light fixture, subject to available ambient light level information; c) a plurality of remote ambient light sensors are respectively adjacent to a plurality of light fixtures at various locations remote from the electronic control section and provide signals to the ambient light sensing section to enable the electronic control section to send light control commands based in part on ambient light conditions.

25. The wireless lighting and electrical device control system of claim 5, in which: a) a plurality of remote occupancy sensors respectively adjacent to remote light fixtures sends occupancy condition signals to an occupancy sensing section of the electronic control section; b) the electronic control section, in response to occupancy events in an area of potential illumination by a remote lighting fixture, sends lighting control commands for different brightness levels depending on different ambient light conditions.

26. The wireless lighting and electrical device control system of claim 3 or 4, in which: a) a light dimming module has multichannel controls that digitally select different precise illumination levels for a plurality of remote light fixtures; b) the light dimming module includes a step dimming circuit which defines the precision of dimming steps, and a delay circuit that defines a period after a motion sensor is triggered before a respective remote light fixture is commanded by the electronic control section to change its power state and illumination output; c) remote light fixture have respective potentiometer dimming circuits that permit local individual external dimming control of a plurality of individual light fixtures.

27. The wireless lighting and electrical device control system of claim 23, in which: a) a plurality of remote motion sensors are respectively adjacent to a plurality of light fixtures at various locations remote from the electronic control section; b) a remote motion sensor that senses a motion toward an area of potential illumination for a remote light fixture causes the electronic control section to send a command for increased illumination from the remote light fixture, subject to available ambient light level information; c) a plurality of remote ambient light sensors are respectively adjacent to a plurality of light fixtures at various locations remote from the electronic control section and provide signals to the ambient light sensing section to enable the electronic control section to send light control commands based in part on ambient light conditions; d) the electronic control section can be re-programmed to send various lighting commands to individual remote light fixtures; e) a plurality of remote occupancy sensors respectively adjacent to remote light fixtures sends occupancy condition signals to an occupancy sensing section of the electronic control section; f) the electronic control section, in response to occupancy events in an area of potential illumination by a remote lighting fixture, sends lighting control commands for different brightness levels depending on different ambient light conditions; g) a light dimming module has multichannel controls that digitally select different precise illumination levels for a plurality of remote light fixtures; the light dimming module includes a step dimming circuit which defines the precision of dimming steps, and a delay circuit that defines a period after a motion sensor is triggered before a respective remote light fixture is commanded by the electronic control section to change its power state and illumination output; i) remote light fixture have respective potentiometer dimming circuits that permit local individual external dimming control of a plurality of individual light fixtures.

* * * * *